(12) United States Patent
Dutch et al.

(10) Patent No.: US 8,347,388 B1
(45) Date of Patent: Jan. 1, 2013

(54) SYSTEM AND METHOD FOR ORCHESTRATING SERVICES

(75) Inventors: Michael John Dutch, Saratoga, CA (US); Christopher Hercules Claudatos, San Jose, CA (US); William Dale Andruss, Minneapolis, MN (US); Bruce David Leetch, Mason, OH (US)

(73) Assignee: EMC Corporation, Hopkinton, MA (US)

( * ) Notice: Subject to any disclaimer, the term of this patent is extended or adjusted under 35 U.S.C. 154(b) by 708 days.

(21) Appl. No.: 12/242,866

(22) Filed: Sep. 30, 2008

(51) Int. Cl.
*G06F 17/00* (2006.01)
(52) U.S. Cl. ............... 726/24; 707/802; 707/803
(58) Field of Classification Search .......... 726/24; 707/802, 803
See application file for complete search history.

(56) References Cited

U.S. PATENT DOCUMENTS

| | | | | |
|---|---|---|---|---|
| 7,103,602 | B2 * | 9/2006 | Black et al. | 707/825 |
| 7,472,242 | B1 | 12/2008 | Deshmukh et al. | |
| 7,814,074 | B2 * | 10/2010 | Anglin et al. | 707/692 |
| 7,941,459 | B1 * | 5/2011 | Erickson | 707/803 |
| 2005/0144254 | A1 | 6/2005 | Kameda | |
| 2005/0257106 | A1 | 11/2005 | Luby et al. | |
| 2006/0015581 | A1 | 1/2006 | Breiter et al. | |
| 2007/0283438 | A1 | 12/2007 | Fries et al. | |
| 2007/0288536 | A1 * | 12/2007 | Sen et al. | 707/204 |
| 2009/0259701 | A1 * | 10/2009 | Wideman et al. | 707/206 |
| 2009/0313248 | A1 * | 12/2009 | Balachandran et al. | 707/6 |

\* cited by examiner

*Primary Examiner* — Brandon Hoffman
*Assistant Examiner* — Samuel Ambaye
(74) *Attorney, Agent, or Firm* — Theodore A. Chen; Krishnendu Gupta

(57) ABSTRACT

Data from application systems is copied to a server. The server generates different views of some or all of the data and provides the views to services that may be running on other systems. Each view may be of a subset of the data on the server, and the subsets may be mutually exclusive. Each view is in a format appropriate to the service consuming it, and the format may be block level, file level, stream, or other format appropriate to the service. The data may be deduplicated, and the deduplicated data processed by a service. The result of the processing of an object containing a deduplicated portion of data may be applied to other objects sharing the deduplicated portion of data. A workflow may be applied to the objects sharing the deduplicated portion of data.

14 Claims, 3 Drawing Sheets

SYSTEM AND METHOD FOR ORCHESTRATING SERVICES

CROSS REFERENCE TO RELATED APPLICATIONS

This application claims priority to co-pending U.S. Provisional Patent Application No. 61/075,854 for COMMONALITY FACTORING FOR VIRUS SCAN filed Jun. 26, 2008, which is incorporated herein by reference for all purposes. This application is related to co-pending U.S. patent application Ser. No. 12/242,874 for ORCHESTRATED NON-DISRUPTIVE AUXILIARY SERVICES and filed concurrently herewith, which is incorporated herein by reference for all purposes.

FIELD OF THE INVENTION

This invention relates generally to providing auxiliary services to computer systems, and more particularly to providing and orchestrating auxiliary services using storage systems and computing systems that act as a proxy for the resources used by application services.

BACKGROUND OF THE INVENTION

This invention relates to a system and method for providing and orchestrating auxiliary services. A typical computing system or computer system allows authorized users to perform the tasks deemed important to the owner of the system. However, these systems may also perform many auxiliary services that enhance but do not directly contribute to completion of the authorized tasks. Auxiliary services, which may include services such as virus protection and data protection, may degrade the productivity of personal computer users to the point where the system is considered unavailable while they are running. On physical servers and virtual servers, the number of clients that can be supported and the functionality that can be provided to them may also be degraded when auxiliary services are run. Degradation in performance due to running auxiliary services may be described in terms of impact on productivity, scalability, and functionality.

As an example of impact on productivity, the consumers of a computing system cannot effectively use it when the response time of the applications they are using is no longer considered interactive. Typically, it is desirable to make authorized consumers of a computing system as productive as possible while safeguarding the data from unauthorized access. Auxiliary services may include data protection and virus protection, and there are many other auxiliary services that can influence productivity, particularly when several such services are run concurrently.

Auxiliary services may affect scalability of a server computing system whose resources are being used to provide auxiliary services in addition to its primary purpose, to provide services to client computing systems. Insofar as the servers are performing auxiliary services, they are not performing their primary purpose. Scalability, i.e., the number of clients which can be supported by a server at any one time, is diminished when auxiliary services are also being performed.

Functionality may be affected by operation of auxiliary services on a system. The capabilities of application services may be affected when they require consumption of resources that cannot be satisfied concurrently with the demands of auxiliary services. Thus, reducing the consumption of resources by auxiliary services that are shared by application services can improve both the scalability and the functionality of application services. For example, more comprehensive virus protection can be provided when more resources are available. In business transactions, more analysis may be performed on transactions when more resources are available.

As described herein, execution of auxiliary services on a computing system may have significant impact on performance in various respects. There is a need, therefore, for an improved method, article of manufacture, and apparatus for performing auxiliary services in a manner that reduces performance degradation of a system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
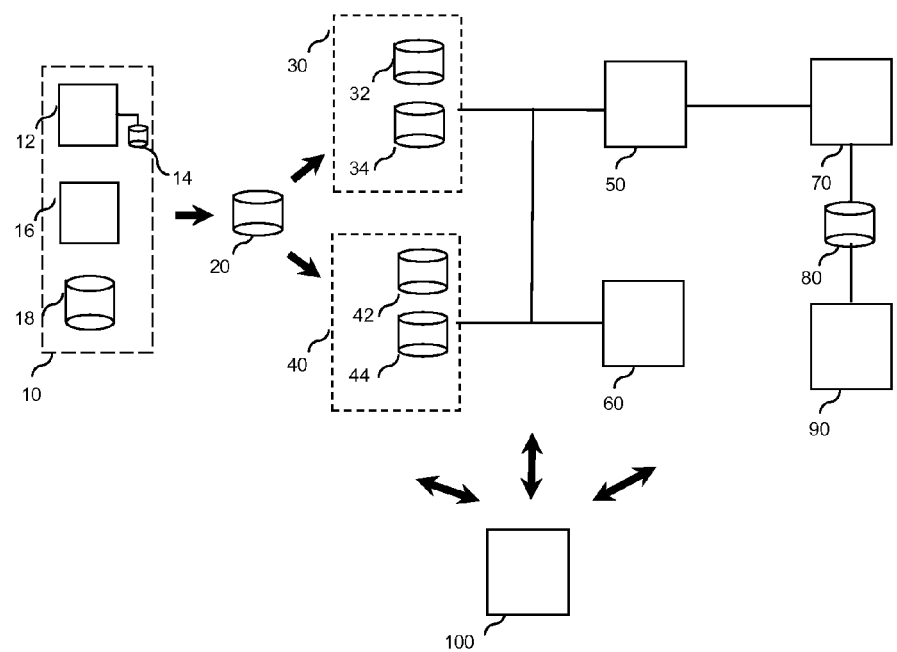
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a computer system on which a data management program executes, but it should be understood that the principles of the invention are not limited to this particular configuration. Although the methods herein are described in terms of their application to auxiliary services, one skilled in the art will recognize that they are equally applicable to other cases for which it is desirable to reduce the impact of performing certain services, and to configurations that extend beyond a local area network. For example, clients may be placed on various machines in remote offices to obtain data and communicate with a server in a central location.

Computing systems are intended to provide application services desired by the owner of the system; i.e. services that the owner of the computing system desires authorized consumers of the computing system to consume for primary business purposes. These application services may access production data on storage systems associated with the computing systems, directly attached or accessed over a network. The set of data that may be accessed by a service may be referred to as a "data set" or simply "data". Auxiliary services are provided to enhance the security, availability, or other characteristic associated with the application services, and may be described as services that the owner of the computing system furnishes to support or enhance application services. The scalability, capabilities, and usability of application services may be affected when the auxiliary services consume resources that are shared with the application services, such as CPU time, memory, and network or storage I/O. Many of these auxiliary services could effectively be performed on other systems, at other times, or on subsets of the data sets used by the application services. Disclosed herein are a method and system to provide and orchestrate auxiliary services using storage systems and computing systems that act as a proxy for the resources used by application services. Also disclosed are methods and systems to offload, partition, and postpone or obviate these auxiliary services in a manner that enhances the ability of the computing systems to perform the application services.

In some embodiments, one or more auxiliary services may be deployed on computing systems not running associated application services. Status about these auxiliary services may be gathered and analyzed to enable both passive and active management of the application services. A workflow manager orchestrates the auxiliary services, coordinating the workflow of processes on one or more computing systems to perform tasks. An administrative interface (or dashboard) may be used to establish policies, monitor events, generate reports, display status and recommendations, support passive and/or active management, and manage the workflow of processes used to accomplish a task. Processes managed through the dashboard may be performed on one or more computing systems, utilizing space-efficient point-in-time copies of the application data residing on persistent storage accessed by the application services.

FIG. 1 illustrates an embodiment of the invention. Application systems 10 may include computers 12 with attached storage 14, computers 16, and network storage 18. Computers 12 and 16 may be in the form of physical servers, virtual servers, personal computers, computer clouds, or any computing configuration on which application services may be performed. Data used and/or generated by the systems in application systems 10 may be stored in attached storage 14, network storage 18, or some other location associated with application systems 10 (such as a cloud storage). Copies of the data may be made using snapshot, disk imaging, or other copying technologies and placed at storage 20. The data may be provided to storage 20 in block, file, or stream format, or any other appropriate format. In some embodiments, storage 20 may be configured to appear like a component already being used by application systems 10, such as a tape library capable of receiving data in a stream, a file server capable of receiving data in file format, or an imaging system capable of receiving data in disk block format.

Storage 20 may comprise a server, storage device in communication with a server, a network storage device, a cloud, or other means of storing, processing, and providing data. Storage 20 is capable of providing different views 30 and 40 of the data to auxiliary systems 50 and 60, which may be clients or servers on which auxiliary services run. Processing to generate a view may be performed by storage 20 or by an additional component, and this may be done before providing the view to an auxiliary service. Auxiliary services may include services that can be effectively performed at a different time or place as the application services they are supporting, and deployed on one or more other computing systems 50 and 60.

Image copies of data stored at storage 20 may be presented to auxiliary services running on systems 50 and 60, in different views 30 and 40 suitable for use by those services, as described herein. Views 30 and 40 may comprise block-level images 32 and 42, file-level images 34 and 44, or other formats usable by an auxiliary service. In this manner, storage 20 effectively serves as a proxy.

The systems on which the auxiliary services are deployed may be simply a system 60, or be further connected to other systems and devices, such as system 50. System 50 may be connected to another system 70 through a firewall (not shown) or through an unsecured connection, and system 70 connects to a storage 80 which is connected to a system 90. For example, system 50 could be a backup client communicating with a backup server 70 through a firewall, which stores data in a data repository 80. System 90 could be another system running a service that operates on the data, such as a replication service or antivirus scanner. All or some of these elements may be optional. Management system 100, on which an administrative interface or dashboard executes, communicates with some or all of the elements to collect status information and/or control their operation. It should be understood that while a specific configuration with a limited number of elements is shown and described, various configurations are possible, with more or fewer elements, and it is intended that the disclosure herein apply to all such configurations.

Figure 2:
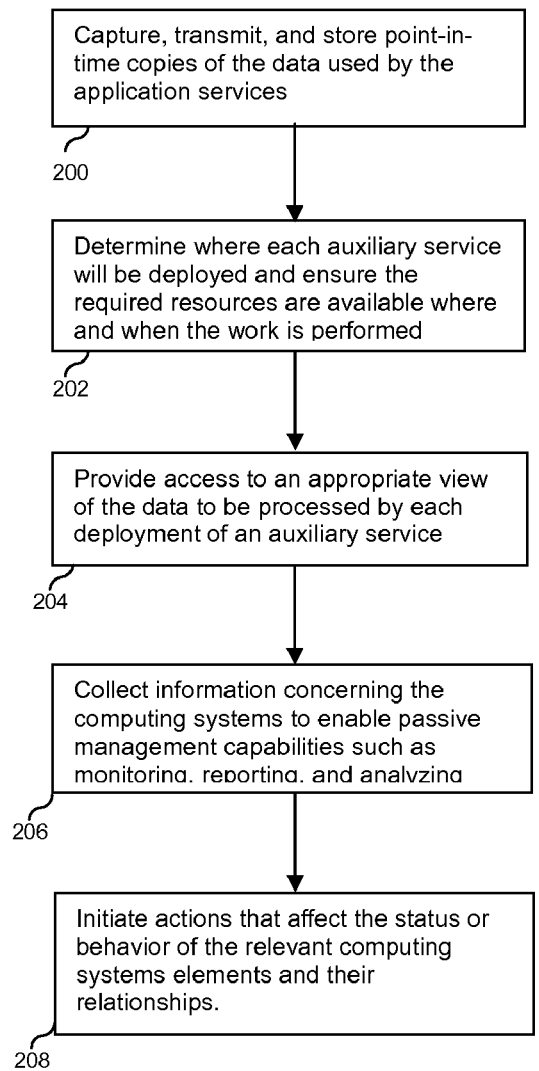
FIG. 2 is a flowchart illustrating a process for orchestrating services in some embodiments the invention.

As shown in FIG. 2, a process may in some embodiments include some or all of the actions described below. One skilled in the art will recognize that significant value may be provided by a subset of these actions, and that useful implementations need not provide capabilities from all of the actions.

Step 200: Capture, transmit, and store point-in-time copies of the data used by the application services. Various technologies may be used, such as application-aware snapshot technologies and incremental forever disk imaging tools. The choice of technologies used may be based on constraints such as application availability, data consistency, and consumption of processor, network, and storage resources.

Step 202: Determine where each auxiliary service will be deployed and ensure the required resources are available where and when the work is performed. Improved security, efficiency, and/or capability may be obtained by deploying an auxiliary service at multiple locations with different partitions or views of the data.

Step 204: Provide access to an appropriate view of the data to be processed by each deployment of an auxiliary service. A view may be considered to be access to data and metadata in a particular format, and may include appropriate metadata generated for that format. The view of a data set reflects the data and storage formats used by the auxiliary service. The formats may include block, file, stream, or other appropriate format, and various application formats (e.g. text, binary, word processing, spreadsheet, etc.) may be used as well. The block format may be a disk block, deduplicated block, or other type of block. For example, an auxiliary service may process raw disk blocks while another may process data using file system semantics. Auxiliary services that are aware of space-efficient storage methods, such as single instance storage (also referred to as de-duplicated storage, in which duplicate files, objects, blocks, etc. are replaced with references to a shared copy), may significantly reduce the amount of work required to process a data set if they have knowledge of and process only the unique data. For example, an antivirus program might normally be configured to examine each of a plurality of files even though the files share many blocks of data. To reduce time and resources required, the antivirus program might instead examine only the unique instances of data in those files, thereby saving time and resources that would have been expended on examining duplicate data.

Step 206: Collect information concerning the computing systems to enable passive management capabilities such as monitoring, reporting, and analyzing elements and their relationships. This status information may be collected using various techniques (e.g., polling, publish/subscribe) and various technologies (e.g.; Simple Network Management Protocol, Web-Based Enterprise Management), and presented as tables, charts, visualizations, etc. for human consumption. The presentation may include detailed status of individual systems, summary status based on correlated events or real-time feeds, or recommended actions based on best practices or policies.

Step 208: Initiate actions, either manually or automatically, that affect the status or behavior of the relevant computing systems. These computing systems may be those performing application services or auxiliary services. This capability, referred to as active management, may be inter-domain neutral, though inter-domain neutrality is not required. In some embodiments, this means that the responsibilities of one organization are not infringed upon by another organization performing its actions. While the actions initiated in one domain may consume the services provided by another domain, they should not materially affect the procedures or policies of another domain. Control over the policies or actions used in one area of expertise are not dictated by another area of expertise. However, a domain may still use services provided by another domain.

Thus, application services on a system may be enhanced by performing auxiliary services on another system. Various technologies may capture a point-in-time copy of the data set accessed by auxiliary services without affecting availability of the application services. This improves performance of the application service, because it no longer uses the resources used by the auxiliary service and is not disrupted by the operation of the auxiliary service. This non-disruptive approach may also be used to improve the performance of the auxiliary service, such as by using other resources that may be more powerful, or by performing the services in parallel.

Figure 4:
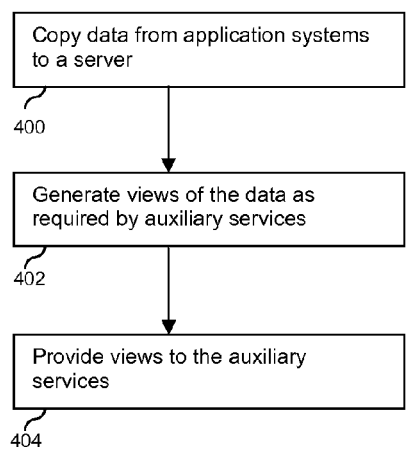
FIG. 4 is a flowchart illustrating a process for providing views of data in some embodiments the invention.

FIG. 4 illustrates a process flow in some embodiments. In step 400, data is copied from application systems 10 to a server 20. Views of the data are generated as required by the auxiliary services, step 402, and the views are provided to the auxiliary services in step 404. Multiple views of the point-in-time copy may be used to accommodate simultaneous processing of the data, improving performance. Some services may be performed at a block-level while others may be performed at a file- or object-level. An object is a data set meaningful to an application. Examples of objects are backup streams, virtual machine images, disk volumes, virtual tape cartridges, unstructured files, email messages, database records, and object-based storage device objects.

Performance may in some embodiments be improved by timing of auxiliary services, such as not performing an auxiliary service unless and until it is necessary, unconstrained by production schedules and demands on the application systems. For example, it might be considered unnecessary to perform malware remediation (repair) on data being backed up or archived unless and until the data is restored or retrieved, because malware in this data would not pose a threat until it is executed. A scan could also be performed at the time of backup, archiving, or copying of production data, and performed again when virus definitions are updated, when the data is restored, etc. As stated above, the timing of the auxiliary services could be determined based on optimizing the performance of auxiliary services, without being constrained by having to share resources with the computing systems running application services.

Postponement of consumption can enhance the services provided if the service capabilities are enhanced before being used. For example, if an antivirus scan is performed, and there is a new virus for which a signature has not yet been developed, the scan may not detect the virus. Postponing execution of this service until after virus definitions have been updated may increase the chances of having the signature to detect the virus, thus "enhancing" the service capability.

In some embodiments, space-efficient views may be used to enable greater efficiency by allowing an auxiliary service to be provided to more consumers of the service and/or by allowing additional capabilities to be provided. A service that can perform a task on one data set and map the results of this task to the result of performing this task on other data sets can obviate the need to repetitively perform the task. For example, if the content of multiple files is identical, analyses of the files might be considered to produce identical results, and the workflow triggered by an analysis of any of these files may be applied to all of these files, thereby avoiding redundant processing. This may apply even if the multiple files are not identical, and may be based on a shared portion. For example, if some files have been deduplicated, and a virus is identified in a shared block, all files containing that block might be tagged as containing the virus. The same workflow (alert, removing the virus, restoring an earlier, non-infected copy from backup, etc.) may be applied to each of the files containing that block.

Figure 5:
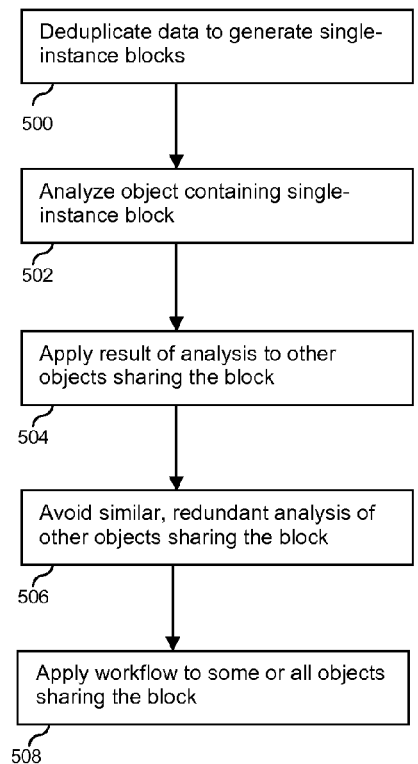
FIG. 5 is a flowchart illustrating a process for providing services using deduplicated data in some embodiments the invention.

FIG. 5 illustrates a process in some embodiments. In step 500, the data is deduplicated to generate single-instance blocks. An analysis is performed on the file or object containing a single-instance block, step 502. In step 504, the result of the analysis may be applied to other objects sharing the single-instance block, and redundant analysis of other objects sharing the single-instance block may be avoided, step 506. A workflow associated with the result may be applied to all objects sharing the single-instance block, step 508.

The topology of the system structure may also provide opportunities to eliminate firewall risks and enable quarantine services. Because there is no direct connection between the computing systems performing the application services and those performing the auxiliary services, there is reduced security risk. For example, for a backup auxiliary service, a connection between the backup server and the backup client is required, but no connection is needed between the backup server and each protected system, resulting in improved security. The restoration process may also be integrated with a threat-detection mechanism. Remediation alternatives may include restoring data to a point-in-time before threat infection. For example, if a file is determined to be infected or otherwise corrupted when it is accessed, it can be restored as well as being disinfected or quarantined.

Genealogy discovery may be used to determine the history of a file, object, or process accessing another file, object, or process. Genealogy discovery may enable targeted repository searches to discover additional remediation opportunities. For example, if a file is determined to be infected, a history of its lifecycle can be used to determine potential times and sources of infection, and other data that was accessed by the same application. Genealogy discovery may be performed by examining a log indicating when the file was opened for output, the name and location of the program used to open the file, and the name and location of other files opened for output by this program.

Figure 3:
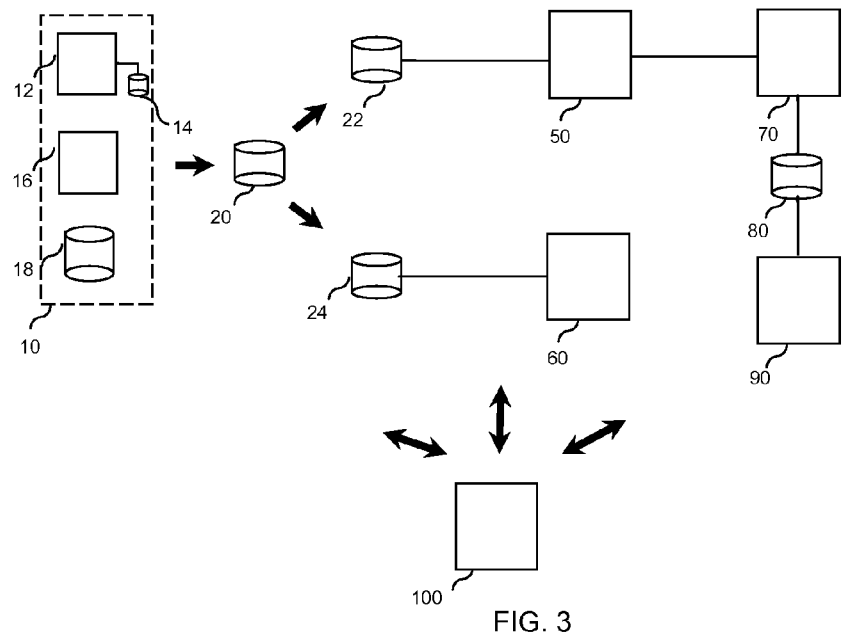
FIG. 3 is a diagram of an embodiment of a system in accordance with the invention.

Several examples will be provided to illustrate some embodiments of the invention. FIG. 3 illustrates one example of creating disk images, partitioning the data in each image into files that will be backed up by a proxy backup client and the data excluded from this process, single-instanced virus protection, and recently-discovered virus protection. Application systems 10 access and/or generate data that is copied to storage 20 through use of snapshot, imaging, or other technologies to create copies of the data at storage 20. Storage 20 provides images 22 and 24 to systems 50 and 60. In this example, image 22 is a view that comprises files to be backed up, while image 24 is a view that comprises data that was excluded from image 22. The data in image 22 may be sent to a backup client running on system 50, communicated to backup server 70 (optionally through a firewall connection), and stored in a data repository 80. An antivirus scanner 90 may scan the data in repository 80, at various times such as when the data is stored, a virus update is received, or data is retrieved from the repository. Antivirus scanning of the data may also take place at systems 50 or 70 or some other element. Data in image 24 may be deduplicated and an antivirus scan performed by system 60. Deduplication may be performed at storage 20, system 60, or by some other element. By scanning the deduplicated image, repetitive effort is reduced and the scan is performed faster.

Backup of a point-in-time copy of a data set from a computing system other than the one used to access the original data set is often referred to as a "server-less backup". In some embodiments, multiple views could be provided to backup services to enable simultaneous backups of data set subsets, "physical" backups using block-based views, or "single-instanced" backups. Thus, parallel or view-based backups may be performed.

In another example, single-instanced virus protection may be provided in accordance with the principles disclosed herein. Applications running on physical servers, virtual machines, and personal computers may require access to data that can be processed to achieve the objectives of the application owners. If this data has been deleted, corrupted, or otherwise put into a state that is not usable by the applications, remediation actions are required to enable application availability. "On access" protection from memory-resident malware is performed when a program is executed on a computing system, to safeguard the system from the effects of program running in system memory. Methods such as virus signature scanning and active system monitoring using heuristics may be used. However, "on demand" protection from storage-resident malware may be achieved by partitioning the data (creating an appropriate view of the set or subset of data to be processed), single-instanced (deduplicated and sharing results of a service for duplicate files), and postponed (service scheduled at an appropriate time) to improve both performance and security. In this manner, performance may be improved by reducing the work performed (such as eliminating duplicative analysis), and security improved by finding infections faster and by finding infections after services capabilities have been enhanced, such as after virus definitions updates. FIG. 3 illustrates an example configuration.

In an embodiment, a computing system may be protected against recently-discovered viruses. A repository containing data collected before a threat was discovered may be remediated at a later time using the most recent threat detection mechanisms. For example, when a file is restored, the most recent anti-virus protection mechanisms and/or definitions may be used to determine whether the file being restored is infected, and disinfect or quarantine the file. A backup or archive repository may also be scanned whenever malware detection capability is updated, independent of repository retrieval requests. Such integration may enhance security by detecting malware that was discovered after a data set was initially moved or copied into a repository and does not affect application services.

In an embodiment, inter-domain reporting may be used. FIG. 1 depicts a feedback loop where status information about computing systems performing application and auxiliary services is being collected and used to manage these systems or initiate other workflows. Status information from within a domain may be gathered from multiple computing systems, additional information obtained or derived based on this status, and actionable information spanning multiple domains may be presented to a user. Workflows may be automatically initiated based on this information.

As an example of cross-pollination between the data protection and security domains, the completion status of recent backup jobs could be augmented with real-time information regarding security threats to suggest changes to standard backup procedures (e.g., more frequent backups or ordering backups based on geographic location). Changes to the backup procedures could be implemented automatically as well.

Status information from multiple computing systems may also be used for monitoring and reporting purposes within a single domain. For example, changes to system configuration that are not authorized by company policy may be detected during backup and flagged as being out of compliance. Such reports may also incorporate support information from multiple sources to encourage rapid issue resolution and customer satisfaction.

Active management may also be used to automate remediation actions based on status information collected and analyzed for passive management. In some embodiments, it may be desirable to enforce inter-domain neutrality. If inter-domain neutrality is enforced, one domain can use the services of another domain, but would not dictate the policies or actions of another domain. For example, a business may have a disaster recovery plan in place. This may be a complicated procedure fraught with potential for errors at many steps both during backup and during recovery. Even when a backup administrator has complete control over his/her own domain ("data protection" in this example) he/she usually finds errors or overlooked items during their periodic disaster recovery plan tests. If another administrator or program automatically changed the backup process (due to what that administrator or program thought was interesting to another domain, say "security") there may be a high likelihood that the disaster recovery plan will no longer work or work as expected. Thus, the business's expectation that data will be in a usable state upon recovery may no longer be valid, perhaps because the application needs to ensure different files are backed up when they were in a transaction-consistent state. This may be something only the application knows, and the business may no longer be able to restart critical applications.

In some embodiments, automating remediation workflows based on company policies may improve productivity while maintaining inter-domain neutrality. Some actions may be taken automatically, such as restoring a previous, approved system configuration. There may be some "pre-approved" set of actions that are known to be acceptable. Regardless of why one of these actions is taken (e.g., if it was triggered by an event from another domain), if the process is authorized to make the change, and the change is "pre-approved", then inter-domain neutrality is respected (because the backup administrator has already understood the impact of and has in effect approved the automated action in advance).

For example, if an anti-virus service detects an infected file but is unable to cleanse it, the company policy may automate the recovery of the file from the most recent backup. An iterative process can also be used to ensure the recovered file is not itself infected. An example of an action that violates inter-domain neutrality, and therefore increases business risk, is automatically altering data protection policies (e.g., frequency and prioritization) based on an analysis of the security status.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for processing deduplicated computer data, comprising:
   deduplicating data to generate single-instance blocks, wherein first and second objects share a portion of the single-instance blocks, wherein the first object includes a first view of the data in a first storage format and the second object includes a second view of the data on the second storage format;
   performing a service on the first object, wherein performing the service includes performing a task on the portion of the single-instance blocks included in the first object to generate a result;
   based on the result, determining whether to perform the service on the second object sharing the portion of the single-instance blocks;
   based on the determination, avoid performing the service on the second object; and
   applying the result of performing the service on the first object to the portion of the single-instance blocks shared by the second object.

2. The method as recited in claim 1, further comprising applying the result to all objects including the portion of the data.

3. The method as recited in claim 2, wherein the portion of the data includes a file.

4. The method as recited in claim 2, wherein the portion of the data includes a block.

5. The method as recited in claim 1, further comprising processing the first object based on the result.

6. The method as recited in claim 5, further comprising processing the second object based on the result.

7. The method as recited in claim 1, wherein analyzing the first object includes performing an antivirus scan.

8. The method as recited in claim 7, wherein the result is a positive result.

9. The method as recited in claim 8, wherein applying the result to the second object includes identifying the second object as having a positive result.

10. The method as recited in claim 9, further comprising quarantining the first object.

11. The method as recited in claim 10, further comprising quarantining all objects including the portion of data.

12. The method as recited in claim 1, further comprising applying a workflow to the first object based on a result of performing the service.

13. The method as recited in claim 12, further comprising applying the workflow to the second object.

14. A computer program product for processing deduplicated computer data, comprising a computer readable medium having program instructions embodied therein for:
   deduplicating data to generate single-instance blocks, wherein first and second objects share a portion of the single-instance blocks, wherein the first object includes a first view of the data in a first storage format and the second object includes a second view of the data on the second storage format;
   performing a service on the first object, wherein performing the service includes performing a task on the portion of the single-instance blocks included in the first object to generate a result;
   based on the result, determining whether to perform the service on the second object sharing the portion of the single-instance blocks;
   based on the determination, avoid performing the service on the second object; and
   applying the result of performing the service on the first object to the portion of the single-instance blocks shared by the second object.

* * * * *